United States Patent [19]

Fassell et al.

[11] 3,956,088

[45] May 11, 1976

[54] PROCESS FOR THE DESTRUCTION OF DEVELOPED AND UNDEVELOPED PHOTOSENSITIVE FILM AND THE RECOVERY OF PRODUCTS THEREFROM

[75] Inventors: Wayne Martin Fassell, Newport Beach; Donald W. Bridges, Irvine, both of Calif.

[73] Assignee: Barber-Colman Company, Rockford, Ill.

[22] Filed: May 1, 1974

[21] Appl. No.: 465,801

[52] U.S. Cl. .............................. 204/109; 75/118 R; 75/118 P; 75/101 R
[51] Int. Cl.² ...................... C22D 1/12; C22B 11/04
[58] Field of Search ............ 75/118 P, 118; 204/109

[56] References Cited
UNITED STATES PATENTS

| | | | |
|---|---|---|---|
| 381,849 | 4/1888 | Russell .............................. | 75/118 X |
| 1,627,582 | 5/1927 | Terry .................................. | 75/118 X |
| 2,867,529 | 1/1959 | Forward et al. ...................... | 75/118 |
| 3,554,883 | 1/1971 | Green .................................. | 204/109 |
| 3,649,250 | 3/1972 | Dorenfeld et al. ................. | 75/118 P |
| 3,660,079 | 5/1972 | Govani .................................. | 75/109 |
| 3,733,256 | 5/1973 | Anderson ............................. | 204/109 |
| 3,793,168 | 2/1974 | Lilly .................................... | 204/109 |

Primary Examiner—G. Ozaki
Attorney, Agent, or Firm—McDougall, Hersh & Scott

[57] ABSTRACT

The destruction of developed or undeveloped photographic film in a manner which permits also the recovery of silver and organic components from the film material in which the film is subjected to wet oxidation at high temperature and high pressure in the presence of a wet oxidation catalyst and a silver complexing compound, and then subjecting the liquor from the wet oxidation step to processing to separate the solubilized silver which is freed from the film and to separate components derived from the film material in the liquor that remains.

20 Claims, 1 Drawing Figure

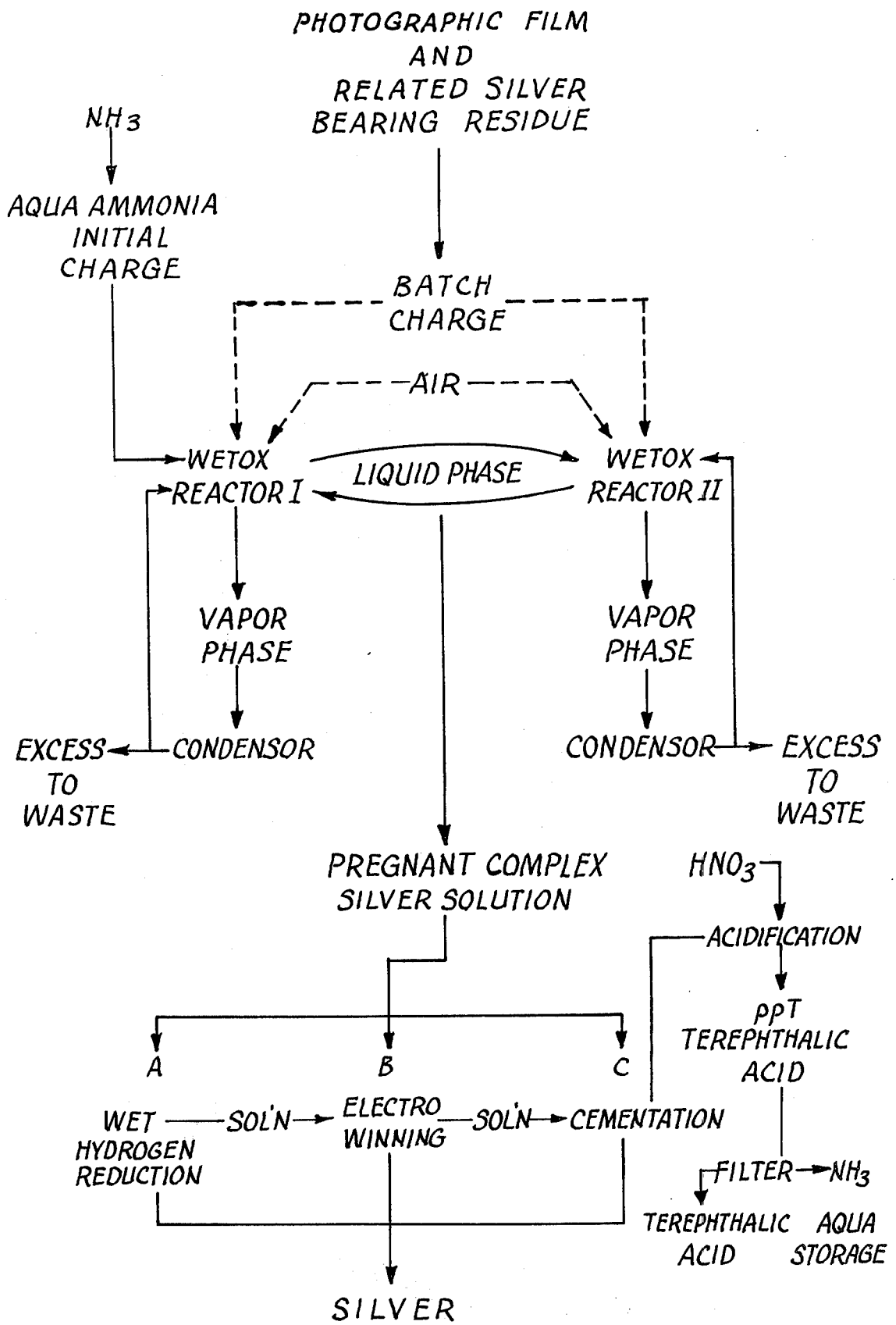

PROCESS FOR THE DESTRUCTION OF DEVELOPED AND UNDEVELOPED PHOTOSENSITIVE FILM AND THE RECOVERY OF PRODUCTS THEREFROM

This invention relates to the recovery of silver and organic by-products from developed or undeveloped light-sensitive emulsion on film, paper or the like base material.

An extensive use is made of photographic film for surveillance, non-destructive testing, medical radiography, data storage, and the like, in addition to the mass utilization of photographic film in cameras, the movie industry, and home movies, wherein the silver emulsion is usually provided on a transparent or translucent film substrate formed of Mylar, triacetate and the like. Similarly, in such copy processes as the diffusion transfer process, for single copy work and master preparation, or in the photocopy of the Polaroid type, considerable use is made of silver halide emulsions on substrates, usually in the form of high wet strength paper or plastic film of the type heretofore described.

A considerable amount of the material ends up as waste and represents a large reserve of silver which, because of its high intrinsic value and projected short supply, should be recovered.

Various techniques have been proposed for the recovery of silver from waste of the type described. In one process, the film is chopped and shredded to liberate the emulsion from the film base. The finely divided material is slurried with water to effect flotation of the film base while the heavier silver emulsion settles to the bottom of the flotation tank. The settled underflow is subjected to centrifugal separation to concentrate the silver salts, which can then be smelted to form ingots or bars of impure silver capable of being refined by the Thum process. Recovery by the described process is expensive and often incomplete.

In another process, the photographic film is incinerated and pyrolyzed as by the use of molten salts wherein reduced silver accumulates as droplets and settles to the bottom of the molten salt bath. In this process, a considerable amount of the silver is lost by volatilization and by incomplete reduction, while the organic film base is lost by combustion with the release of undesirable gases which pollute the atmosphere.

Many attempts have been made, in recent years, to salvage the film base for re-use. These approaches have not found commercial success since the cost of recovery is relatively high and the market for such salvaged base material is limited. However, where classified data are involved, it is necessary to provide for complete destruction of the film base, in order to prevent retrieval of classified information, from the image or the latent image often present as an integral part of the film base.

It is an object of this invention to provide a procedure for processing developed and/or undeveloped silver emulsion coated organic substrates for the recovery of silver and organic by-products, in which the process is characterized by:

1. complete recovery of substantially all of the silver;
2. treatment of bulk material without manual or mechanical pre-processing to minimize cost;
3. yield of a refined or easily refined silver; '4. rapid processing to minimize silver inventory;
5. minimum environmental impact;
6. recovery of marketable by-products from the organic film substrate; and
7. decomposition of the substrate material and emulsion to preclude retrieval of images or latent images retained thereon.

These and other objects and advantages of this invention will hereunafter appear and for purposes of illustration, but not of limitation, a flow diagram is submitted herewith as representative of a process embodying the features of this invention.

Briefly described, in accordance with the practice of this invention, silver emulsion coating, developed and/or undeveloped, and the organic film base, such as triacetate, Mylar (terephthalate acid esters) etc., are placed in an autoclave together with sufficient amount of silver complexing agent, such as ammonium, hydroxide, to form a complex compound with the silver that is present, such as to form a silver amine complex when use is made of ammonia.

Sufficient excess of the ammonium hydroxide is provided to insure that the organic depolymerization products of the film base are formed as their corresponding soluble amine, amide, or the like soluble nitrogen containing organic compounds resulting from the reaction between the film material of the film base and the ammonium hydroxide.

The mixture of silver emulsion coated film base, water and complexing agent is subjected to wet oxidation at a temperature above about 400°F but less than 500°F, and at elevated pressure such as within the range of 500 to 1000 p.s.i.g. and preferably 650 to 1,000 p.s.i.g., in the presence of oxygen containing gas, such as oxygen or air, The oxygen in the form of oxygen, air or other oxygen containing gas is incorporated in a ratio within the range of 0.2 to 1 of the theoretical chemical oxygen demand (COD) of the organic material that is present. The mixture of film, water and complexing agent is agitated sufficiently to insure that the rate of oxygen dissolution in the liquid phase is not rate-limiting to the wet oxidation of the materials which are suspended or dispersed in the aqueous liquor. In the preferred practice of this invention, when use is made of ammonium hydroxide as the complexing agent, the wet oxidation reaction is carried out at a temperature preferably within the range of 460°–465°F, with an oxygen/COD ratio of 0.7 to 0.85, with the ammonia 1.5 to 2 times the amount required to form an amine complex with the silver present, all of which can be calculated in advance from the known composition of the film material to be processed.

The wet oxidation reaction is markedly enhanced by the presence of a catalyst. For this purpose, use can be made of salts which provide free ions of copper, silver, and ammonia in the amount within the range of $10^{-2}$ to $10^{-4}$ moles per liter, when calculated on the basis of copper sulphate. The silver catalyst can be supplied from the dissolution of silver during the wet oxidation reaction or by the addition of silver salt, such as silver sulphate.

When calculated on the basis of ammonium sulphate as the preferred source of the ammonium ion, the amount of ammonium sulphate added to the mixture for the wet oxidation reaction should be within the range of 75–150 grams per liter. There is reason to believe, from the observations which have been made, that the added ammonium sulphate also functions as an effective wet oxidation catalyst, such observations being predicated on batch experiments in which 30–40 grams of chopped film has been subjected to wet oxidation under the conditions described.

Upon completion of the wet oxidation reaction, all of the materials present appear to be in solution except for small or trace amounts of solids which can be separated out as inert material or else recycled for additional wet oxidation in the next batch. The liquor can be used again and again in the wet oxidation of additional emulsion coated film until the concentration of materials builds up to a level for efficient removal of products resulting from the wet oxidation, thereby to provide considerable savings in processing steps, formulation, and utilization of chemicals. In the alternative, the product from the wet oxidation step can be subjected directly to processing for the removal or recovery of various of the valuable components in solution therein.

Having described the basic concepts of this invention, an example of the practice of the invention will hereinafter be given by way of illustration, but not by way of limitation.

30.8 grams of undeveloped photographic film, containing 1.14% silver concentrated in the silver emulsion, on a Mylar base, was chopped into small pieces and introduced along with 150 grams of ammonium sulphate, $10^{-3}$ moles of copper sulphate and water in an amount to make up 1.5 liters, into a reactor of the type described in our copending applications, Ser. No. 400,123, now U.S. Pat. No. 3,870,631 and Ser. No. 403,652, now U.S. Pat. No. 3,852,192. The wet oxidation reactor, in the form of an autoclave, for high pressure operation, is provided with a high speed stirrer and inlets for the introduction of air at or near the vortex of the stirrer for immediate and uniform distribution of the air as fine particles throughout the liquor for maximum dissolution of oxygen therein. The wet oxidation was carried out with the constant introduction of air, and constant stirring, with the liquor maintained at a temperature of 460°F and under 1,000 psig until dissolution of the material was substantially complete, or for about one to two hours. The COD of the effluent was calculated as 812 mg/l-0.

The effluent was recycled to the wet oxidation reactor with 32.8 grams of chopped film introduced into the reactor as a second charge. The reactor was operated in the same manner as before, except that a pressure of 970 psig was used. The effluent from the wet oxidation of the second batch had a COD of 685 mg/l-0.

The liquor effluent from the second batch was recycled for a second time for wet oxidation of an additional 32.5 grams of chopped film at 461°F and 1,035 psig. The effluent liquor, having a COD of 869 mg/l-0 was recycled for the third time for wet oxidation with an additional increment of 34.9 grams film, at 460°F and 695 psig. The final liquid phase, identified in the flow diagram as pregnant complex silver solution, had a COD of 897 mg/l-0.

The final effluent contained 1,246 grams per liter of silver.

The silver can be recovered from the pregnant complex silver solution or leach liquor by a number of ways, including:

1. the addition of sulphuric acid to produce silver sulphate which precipitates and can be separated by conventional water-solid separation techniques;

2. the addition of nitric acid to convert the silver amine complex to silver nitrate in accordance with the process described by D. M. Liddell, Handbook of Non-Ferrous Metallurgy, Recovery of the Metals, Chapter X, p. 275, McGraw-Hill Publishing Company, followed by electrowinning as by the Moebius, process;

3. by hydrogen reduction of silver chloride precipitated from the silver amine solution by the introduction of chloride ion;

4. by direct hydrogen reduction of the silver amine complex solution with gaseous hydrogen under high temperature and pressure;

5. by direct reduction of the silver from solution by such reducing compounds as glucose and formaldehyde.

In the example described, direct reduction with hydrogen was used by introduction of hydrogen under high pressure in the same reactor or autoclave used to carry out the high pressure, high temperature wet oxidation. Reduction with hydrogen was carried out at a temperature of 420°–500°F under a pressure within the range of 700 to 1,000 psig. The freed silver precipitated and was recovered from the liquor by filtration, centrifugation, decantation, or the like liquid-solid separation techniques.

After removal of the silver, the remaining leach liquor contains the terephthalate derived from the Mylar film base, in the form of the amine or amide. The liquor is acidified, as with a mineral acid such as nitric or sulphuric acid to a pH within the range of 2 to 5 to form terephthalic acid which separates out as a precipitate. It is preferred to make use of nitric acid for acidification, since any trace quantities of silver will then be retained in solution for recycling with a new batch of pregnant complex silver solution.

It will be apparent from the foregoing that we have provided a process which, in the first place, operates efficiently and effectively to destroy imaged or unimaged photosensitive film, and which operates effectively and efficiently to convert the film materials into a form from which the silver can be recovered in a usable form and from which the organic materials derived from the film base can be recovered in a useful form.

It will be understood that changes may be made in the details of formulation and operation, without departing from the spirit of the invention, especially as defined in the following claims.

We claim:

1. A process for the destruction of developed or undeveloped film having a silver emulsion coating comprising the steps of mixing the film with an aqueous medium containing an agent which forms a soluble complex with silver, subjecting the mixture to wet oxidation at elevated temperature and elevated pressure while introducing an oxygen containing gas under a high state of agitation for rapid distribution of the oxygen into the liquid mixture, continuing the wet oxidation reaction until the chemical oxygen demand COD of the organic material in the mixture is reduced and the silver and film material are converted to a soluble state within the resulting liquor, and treating the liquor to separate the silver.

2. A process as claimed in claim 1, in which the wet oxidation reaction is carried out in the presence of a wet oxidation catalyst.

3. The process as claimed in claim 2 in which the catalyst is selected from the group consisting of ions of copper, silver and ammonium.

4. The process as claimed in claim 3 in which, when the catalyst is copper ion, the ions are present in an amount within the range of $10^{-2}$ to $10^{-4}$ moles per liter when calculated on the basis of copper sulphate.

5. The process as claimed in claim 3 in which the copper, silver and ammonium ions are provided in the form of the sulphates of copper, silver and ammonium.

6. The process as claimed in claim 1 in which the agent which forms a soluble complex with the silver is a complex which forms a silver amine or amide complex.

7. The process as claimed in claim 6 in which the complexing compound is in the form of an ammonium ion.

8. The process as claimed in claim 7 in which the ammonium complexing compound is selected from the group consisting of ammonium hydroxide and ammonium sulphate.

9. The process as claimed in claim 6 in which the complexing compound is present in an amount within the range of 1.5 to 2 times the amount required to form the complex with the amount of silver that is present.

10. The process as claimed in claim 1 in which the wet oxidation reaction is carried out at a temperature within the range of 400°–500°F.

11. The process as claimed in claim 1 in which the wet oxidation reaction is carried out at a temperature within the range of 460°–465°F.

12. The process as claimed in claim 9 in which, when the complexing agent is present in the form of ammonium hydroxide, the wet oxidation reaction is carried out at a temperature within the range of 460°–465°F, and at a pressure within the range of 500-1000 psig.

13. The process as claimed in claim 1 in which the wet oxidation reaction is carried out at a pressure within the range of 500–1000 psig.

14. The process as claimed in claim 1 in which the wet oxidation reaction is carried out at a pressure within the range of 650–1000 psig.

15. The process as claimed in claim 1 in which the oxygen containing gas is air.

16. The process as claimed in claim 1 in which the oxygen is introduced in an amount to provide an oxygen/COD ratio of 0.2 to 1.0.

17. The process as claimed in claim 1 in which the oxygen containing gas is introduced into the aqueous liquid in the immediate vicinity of the vortex of the agitator.

18. The process as claimed in claim 1 in which the solubilized silver in the liquor resulting from the wet oxidation is separated by the addition of nitric acid to convert the silver ions to silver nitrate, and then electrowinning the silver from the silver nitrate solution.

19. The process as claimed in claim 1 in which the liquor remaining from the wet oxidation step is recycled with additional emulsion coated film through a subsequent wet oxidation step until the amount of dissolved material rises to levels suitable for the subsequent separation step.

20. A process for the destruction of photosensitive film (developed or undeveloped) and the recovery of products therefrom comprising the steps of mixing the film with an aqueous medium for suspension or dispersion of the film in the aqueous medium, subjecting the mixture to wet oxidation at elevated temperature and at elevated pressure, while introducing an oxygen containing gas under a high state of agitation for substantially immediate dissolution of the oxygen in the liquid mixture, and continuing the wet oxidation reaction until the film materials are substantially converted to a soluble state within the liquor, and then processing the resultant liquor to separate out various of the components derived from the destruction of the film.

* * * * *